Jan. 30, 1951  E. F. JIRSA ET AL  2,539,666
ADJUSTABLE DRAFT STRUCTURE FOR VEHICLES
Filed Oct. 25, 1948  2 Sheets-Sheet 1
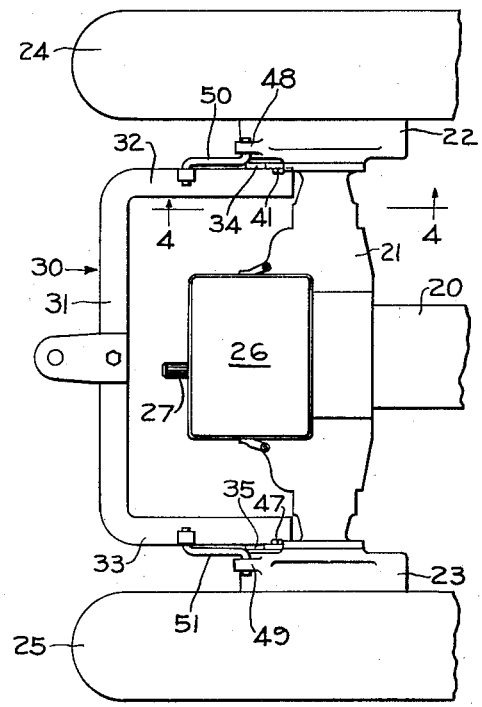
FIG. 1
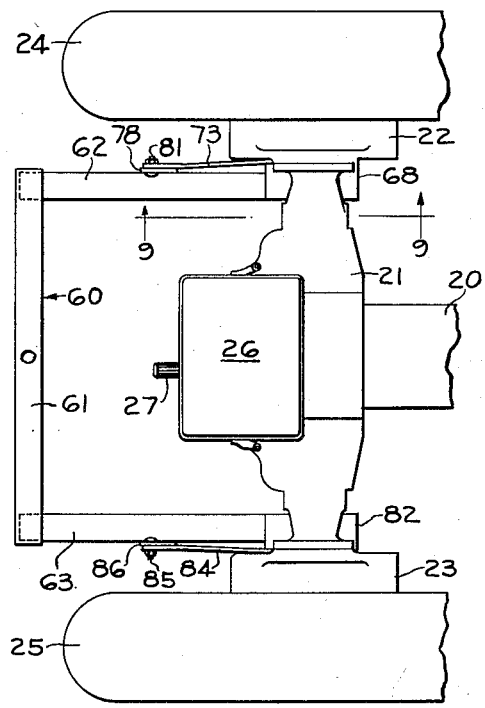
FIG. 6
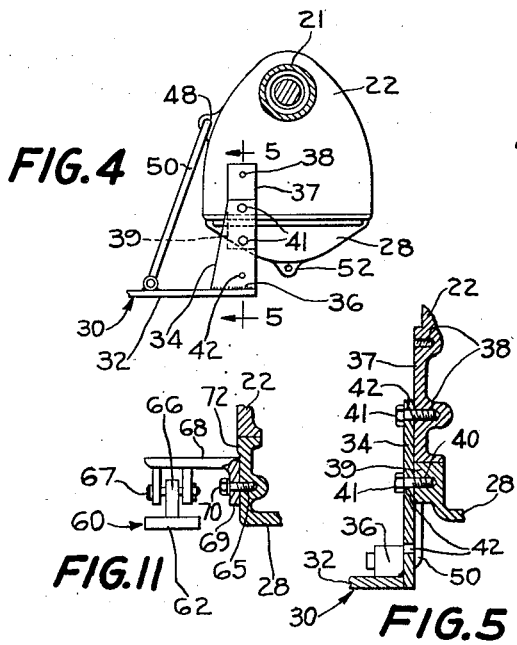
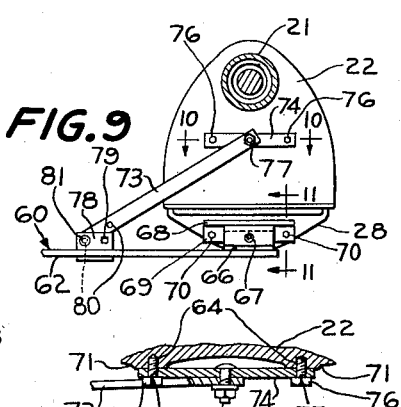
INVENTOR.
E. F. JIRSA
J. S. ROSS
ATTORNEYS Jan. 30, 1951 E. F. JIRSA ET AL 2,539,666
ADJUSTABLE DRAFT STRUCTURE FOR VEHICLES
Filed Oct. 25, 1948 2 Sheets-Sheet 2
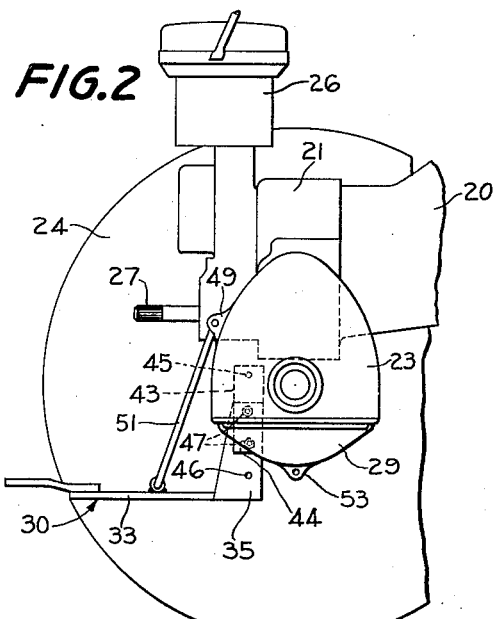
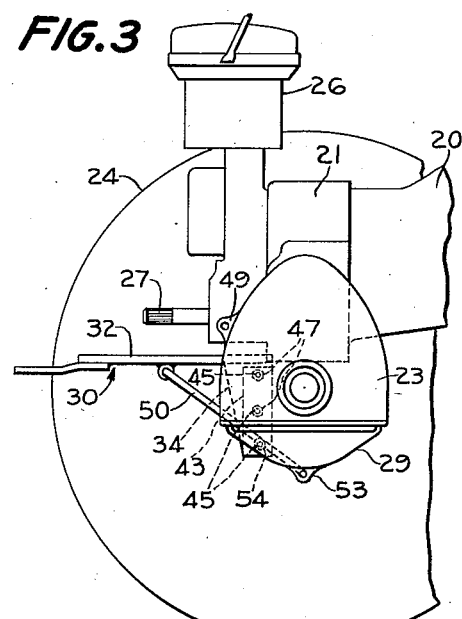
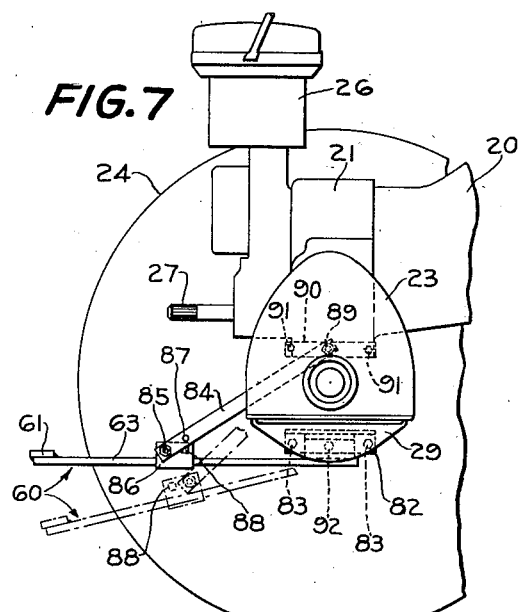
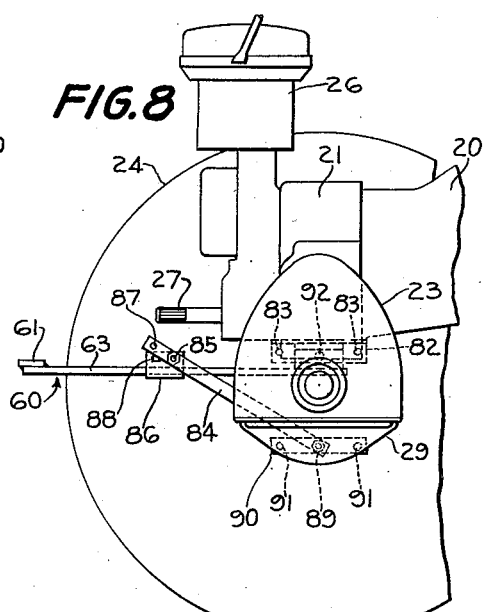
INVENTOR.
E. F. JIRSA
J. S. ROSS
BY
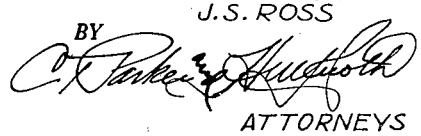
ATTORNEYS Patented Jan. 30, 1951

2,539,666

UNITED STATES PATENT OFFICE 2,539,666

ADJUSTABLE DRAFT STRUCTURE FOR VEHICLES

Emil F. Jirsa and James S. Ross, Waterloo, Iowa, assignors to Deere Manufacturing Co., Dubuque, Iowa, a corporation of Iowa Application October 25, 1948, Serial No. 56,342

2 Claims. (Cl. 280—33.44)

This invention relates to vehicle draft structure and more particularly to a vehicle drawbar that is adjustable between relatively high and low positions.

In many instances in the use of tractor-connected agricultural implements, as in the cultivation of cane, it is desirable to use a tractor of the high-clearance type; that is, a tractor in which greater clearance is afforded between the ground and the under portion of the tractor. In these instances, it is feasible to provide a drawbar or other equivalent supporting structure disposed at a height commensurate with the increased clearance obtainable. In other instances, in the same tractor, it is desirable that the drawbar or supporting structure be arrangeable at a relatively lower level. The reason for having the drawbar at one height or another depends largely upon whether implements connected to the tractor are directly mounted on the tractor or are drawn thereby, it being obvious that the most effective drawbar pull will be obtained when the drawbar is in a requisite low position.

One of the principal objects of the present invention pertains to a drawbar that is capable of being inverted between positions at different levels with respect to the ground. A further important object in this respect is the provision of means whereby the drawbar may be utilized in either of its two positions by applying the same mounting means in both instances. A still further object is to provide mounting means that are easily and readily interchangeable between two mounting positions on the tractor or equivalent vehicle so that the drawbar can be arranged at either level without requiring additional supporting structure.

The foregoing and other objects and desirable features inherent in and encompassed by the invention will become apparent to those versed in the art as two preferred embodiments of the invention are set forth in detail in the following description and accompanying sheets of drawings in which:

Figure 1 is a plan view of a rear portion of a tractor embodying one form of the drawbar structure;

Figure 2 is a side elevational view of the structure shown in Figure 1, the near rear wheel being removed and the drawbar being illustrated at its lower level;

Figure 3 is a view similar to that shown in Figure 2, but illustrating the drawbar at its higher level;

Figure 4 is a fragmentary sectional view taken substantially on the line 4—4 of Figure 1 and illustrating more clearly the mounting structure for the drawbar of Figures 1, 2 and 3;

Figure 5 is a fragmentary sectional view taken on the line 5—5 of Figure 4, Figure 5 being drawn on an enlarged scale and illustrating the mounting portions on the tractor;

Figure 6 is a view similar to that appearing in Figure 1, but illustrating a modified form of drawbar structure;

Figure 7 is a side elevational view of the structure shown in Figure 6, the near rear wheel being removed and the drawbar being illustrated in its lower position in full lines, the broken line position of the drawbar representing an adjustment thereof;

Figure 8 is a view similar to that appearing in Figure 7 but showing the drawbar at a higher level;

Figure 9 is a fragmentary sectional view taken on the line 9—9 of Figure 6 and illustrating more clearly the mounting portions on the tractor;

Figure 10 is an enlarged fragmentary sectional view taken on the line 10—10 of Figure 9 and illustrating the upper mounting portion on one side of the tractor; and Figure 11 is an enlarged fragmentary sectional view taken on the line 11—11 of Figure 1 and illustrating a lower mounting portion.

Figures 1–5

The basic vehicle chosen for the purposes of illustration is a tractor; although, the drawbar or supporting structure may be mounted on any equivalent vehicle. As will be brought out in the following description, the specific type of vehicle itself forms no part of the present invention.

The tractor shown in the drawings is representative of the usual agricultural tractor having a longitudinal narrow body 20 provided with a transverse rear axle structure 21 which has at each of its opposite ends depending final drive housings 22 and 23. The rear end of the tractor is carried on the axle structure 21 by means of a pair of laterally spaced traction wheels 24 and 25. The representative tractor structure is completed by the provision of an operator's seat 26 and the rear portion of the tractor, including the axle structure 21, may be provided with a rearwardly extending power take-off shaft 27. The depending housings 22 and 23 are of the type including removable bottom covers 28 and 29 respectively.

The depending housings 22 and 23, which are part of the tractor body or main supporting structure, are provided with means for carrying a draft or supporting frame in the form of a drawbar, designated generally by the numeral 30. The drawbar illustrated is representative of a conventional type to the extent that it is U-shaped in plan and comprises a transverse rear portion 31, a left hand leg portion 32 and a right hand leg portion 33. The forward ends of the legs are provided with means in the form of connecters or plates 34 and 35 respectively. Each connecter 34, 35 is secured to its respective leg 32, 33 as by welding at 36 (Figures 4 and 5).

The depending housing structure 22 is provided with a first mounting means or portion in the form of a pad 37 (Figures 4 and 5) provided with a plurality of vertically spaced tapped bores 38. The associated cover housing 28 includes as an adjunct to the mounting pad 37, a mounting pad 39 which is provided with a tapped bore 40 vertically spaced below the lower of the tapped bores 38. When the drawbar structure is at its lower level, as shown in Figures 2 and 4, the lower bore 38 and bore 40 in the cover housing 28 receive a pair of securing means in the form of cap screws 41, which pass through the two uppermost apertures of a plurality of apertures 42 in the connecter 34. The upper bore 38 is not used in this embodiment of the invention; although, it will be apparent that the connecter 34 could be extended and provided with another aperture to receive a third cap screw.

The opposite depending housing structure, including the housing 23 and its cover housing 29, is provided with similar structure that provides a mounting portion including a pad 43 on the housing 23, a pad 44 on the cover housing 29, a plurality of tapped bores 45 in the pads, a plurality of apertures 46 in the connecter 35, and securing means in the form of cap screws 47. The structure at the right side of the rear portion of the tractor is a duplicate of that at the left side.

For the purpose of additionally supporting the drawbar 30 in its lower position, the depending housings 22 and 23 are provided respectively with second mounting portions in the form of apertured ears 48 and 49. The drawbar 30 is provided with additional connecting structure in the form of braces 50 and 51 pivotally connected respectively to the legs 32 and 33 of the drawbar. When the drawbar is at its lower level, as shown in Figures 2 and 4, the braces 50 and 51 are connected respectively to the apertured ears 48 and 49. Thus, the drawbar is adequately supported and braced.

For the purpose of supporting the drawbar at a higher level, the depending housings 22 and 23 are provided with additional mounting or supporting means. In one case, the cover housing 28 is provided with an apertured ear 52 and the cover housing 29 is provided with an apertured ear 53. When the drawbar is at its lower level, the ears 52 and 53 are not used.

In the inversion of the drawbar for disposition thereof at a higher level, the cap screws 41 are removed at the left side of the tractor and the cap screws 47 are removed at the right side. The drawbar is inverted as shown in Figure 3 and the cap screws 47 are utilized to secure the connecters 35 and 34 respectively to the depending housings 22 and 23. As indicated in Figure 3, an additional cap screw 54 may be utilized in each of the bores of the mounting pads 39 and 44 on the cover housings 28 and 29 respectively. In the high level position of the drawbar 30, the braces 50 and 51 are connected respectively to the lower apertured ears 53 and 52. In the low position of the drawbar, the braces extend upwardly and forwardly for connection to the tractor; in the high position of the drawbar, the braces extend downwardly and forwardly for connection to the tractor.

From the foregoing it will be seen that the improved mounting means provide for arranging the drawbar at either of two levels with respect to the ground. The mounting means are such that additional structure is not needed in the necessary inversion and interchangeability, with the exception of the additional cap screws 54 which may be dispensed with if desired. The connection of the braces 50 and 51 to the drawbar includes pivot means to accommodate changes in angularity of the braces with respect to the drawbar, as will be indicated by a comparison of Figures 2 and 3.

Figures 6–11

In this form of the invention, the illustrated tractor is substantially identical, with the exception of minor changes in the depending housings. However, these changes will be ignored and the tractor structure per se will bear reference characters similar to those employed in the description and illustration of that form of the invention appearing in Figures 1–5.

In the modified form of invention, the drawbar is designated generally by the numeral 60 and, like the drawbar 30, is of conventional design in so far as it is U-shaped as viewed from above, comprising a rear transverse member 61 and left hand and right hand forwardly extending legs 62 and 63, respectively, each of the latter having at its forward end means for mounting the drawbar on the supporting structure comprising the tractor body 20, rear axle structure 21 and depending housings 22 and 23.

A vertically intermediate portion of the left hand depending housing 22 is provided with a pair of longitudinally spaced tapped bores 64 (Figure 10) providing part of a first mounting portion. A second mounting portion is provided on the cover housing 28 in the form of a pair of longitudinally spaced tapped bores 65, one of which appears in Figure 11. The longitudinal spacing of the bores 64 is the same as that of the bores 65.

The forward end of the leg 62 of the drawbar 60 is provided with connecting means including a first connecter part 66 apertured on a transverse axis to receive a pivot pin 67 (Figure 11). The pin 67 is used to pivotally connect the forward end of the leg 62 to a second connecter part 68 in the form of an angled member having an apertured flange 69 which, in the lower position of the drawbar, is connected to the cover housing 28 by a pair of longitudinally spaced securing means in the form of cap screws 70. The portions of the housing 22 and housing cover 28 in which the tapped bores 64 and 65 are formed may be provided with thickened portions in the form of mounting pads 71 and 72 as illustrated in Figures 10 and 11 respectively.

In addition to the connecter 66—68, the left hand side of the drawbar 60 is supported by second supporting means in the form of a brace 73 having one end connected to a longitudinally extending member 74 which is provided with a pair of longitudinally spaced apertures 75 (Figure 10). The spacing of the apertures 75 is on the order of the spacing of the tapped bores 64 and securing means in the form of a pair of cap screws 76 is utilized to secure the member 74 to the depending housing 22. The one end of the brace 73 is connected to the member 74 by securing means including a nut and bolt assembly 77. The other end of the brace 73 is connected to the leg 62 of the drawbar 60 by connecting means including an angled member 78 fixed to the drawbar and provided with a pair of longitudinally spaced apertures 79, one of which is visible in Figure 9. For the purpose of establishing a connection between the end of the brace 73 and the member 78, the brace is provided with a pair of spaced apertures 80, as will be apparent in Figure 9. Securing means in the form of a nut and bolt assembly 81 may be utilized to secure the brace and the member 78 together.

The forward end of the other drawbar leg 63 is provided with a connecter 82 comprising parts similar to 66 and 68. The connecter 82 is mounted on the inside face of the cover housing 29 of the depending housing 23 by means including a mounting pad (not shown) and a pair of longitudinally spaced cap screws 83. The right side of the drawbar includes a brace 84 which is connected at 85 to a member 86 on the leg 63. This end of the brace may have a pair of apertures 87 like the apertures 80 in the end of the brace 73. Likewise, the member 86 will have a pair of longitudinally spaced apertures 88 like the apertures 79 in the member 78. The upper end of the brace 84 is connected at 89 to a member 90 which is secured by a pair of longitudinally spaced cap screws 91 to mounting means identical to the mounting means shown in Figure 10.

The connection of the forward end of the drawbar leg 63 to the connecter 82 is accomplished by a pivot 92 identical to the connection at 66—67 (Figure 11).

When the drawbar is at its lower level, as shown in Figure 7, the forward ends of the drawbar are carried by the mounting pads or portions provided respectively on the left hand and right hand depending housings 22 and 23. The braces 73 and 84 extend upwardly and forwardly from the drawbar to the upper mounting pads or portions. As indicated in Figure 7, the angle of the drawbar with respect to the tractor may be varied by utilizing different ones of the apertures in the braces and drawbar members 78 and 86, a result that will be clear without further explanation.

When it is desired to interchange the connections for the disposition of the drawbar at the higher level shown in Figure 8, it is necessary only to remove the cap screws 70, 76, 83 and 91 and to interchange the connecters vertically; that is, at the left side of the tractor, the member 69 is moved up to the mounting pad portion 71 including the tapped bore 64 and is secured in place by any pair of cap screws, and the upper member 74 is moved down to the lower mounting portion and secured by a pair of cap screws. A like procedure is followed at the right side of the tractor, involving only the interchanging of the members 82 and 90 and utilization of the remaining cap screws. Again, the angular relationship of the drawbar to the tractor may be varied by utilizing different ones of the apertures in the braces and drawbar members 78 and 86.

*Summary*

In either of the forms of invention illustrated above, the interchangeability or inversion of the drawbar between two positions to afford different levels of support is accomplished by the use of simple mounting means that requires the addition of no further supporting structure in one position or the other. Either drawbar and the mounting means therefor may be easily and inexpensively fabricated and readily adapted to most tractors of the conventional type illustrated. Other features of the invention not specifically pointed out above will occur to those versed in the art, as will many modifications and variations in the preferred forms of the invention illustrated, all of which may be achieved without departing from the spirit and scope of the invention as defined in the appended claims.

What is claimed is:

1. Draft means for a vehicle having a supporting structure, comprising: first, second and third mounting means on said structure spaced vertically apart so as to be at different levels with the first means at the lowest level, the second at the highest level, and the third at an intermediate level, each mounting means including a member-receiving opening; a drawbar; vertically extending means on the drawbar providing for inverting of the drawbar to dispose the drawbar at either a high or a low position; and connectible to the intermediate mounting means in either position of the drawbar, said vertically extending means on the drawbar including a plurality of member-receiving openings spaced vertically apart; a member receivable by the opening in the intermediate means and a selected low or high opening of said plurality according to the position of the drawbar; and brace means connectible to the drawbar and connectible with the lowest mounting means when the drawbar is in its high position and connectible with the highest mounting means when the drawbar is in its low position, said brace means including a member receivable by the opening in either the highest or the lowest mounting means, according to the position of the drawbar.

2. Draft means for a vehicle having a longitudinally extending supporting structure, including a pair of transversely spaced and alined, vertical supporting portions, comprising: a pair of vertically spaced, substantially vertically alined mounting pads on each supporting portion and thus providing a pair of transversely spaced and alined upper pads and a pair of transversely spaced and alined lower pads; a drawbar adapted to extend generally horizontally and longitudinally from said portions in either a high or a low position determined by the relative levels of the mounting pads; a pair of connecters on the drawbar spaced apart transversely according to the transverse spacing of the pads on the supporting portions; means for connecting said connecters respectively to the pair of lower pads; a pair of brace members connected to the drawbar and having portions spaced transversely apart according to the transverse spacing of the pads; means for connecting said brace member portions respectively to the pair of upper pads to complete the support of the drawbar in a low position; said connnecters and brace members being constructed for interchangeability respectively from the lower and upper pads to the upper and lower pads to support the drawbar in a high position; and the interconnection between the drawbar and mounting pads as effected by the connecters including means providing for tilting of the drawbar with respect to the horizontal, and the interconnection between the drawbar and mounting pads as effected by the brace members including provision for extension or contraction to support the drawbar as tilted in either its high or low position.

EMIL F. JIRSA.
JAMES S. ROSS.

REFERENCES CITED

The following references are of record in the file of this patent:

UNITED STATES PATENTS

| Number | Name | Date |
|---|---|---|
| 1,715,682 | Starks | June 4, 1929 |
| 2,052,303 | Johnston et al. | Aug. 25, 1936 |